US006618126B2

United States Patent
Shirai et al.

(10) Patent No.: US 6,618,126 B2
(45) Date of Patent: Sep. 9, 2003

(54) SURVEYING INSTRUMENT HAVING A SIGHTING TELESCOPE AND A PHASE-DIFFERENCE DETECTION TYPE FOCUS DETECTION DEVICE THEREFOR

(75) Inventors: Masami Shirai, Saitama (JP); Masayuki Murata, Saitama (JP); Takayuki Ito, Saitama (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/865,705

(22) Filed: May 29, 2001

(65) Prior Publication Data

US 2001/0048518 A1 Dec. 6, 2001

(30) Foreign Application Priority Data

May 30, 2000 (JP) ........................................ 2000-159764

(51) Int. Cl.[7] ................................................. G01C 3/08
(52) U.S. Cl. ......................................................... 356/5.1
(58) Field of Search ................................. 356/3.01–5.15

(56) References Cited

U.S. PATENT DOCUMENTS

| | | | |
|---|---|---|---|
| 4,559,445 A | * 12/1985 | Hedin et al. | ................. 250/203 |
| 4,707,103 A | * 11/1987 | Ikemori et al. | ............. 354/403 |
| 4,745,289 A | * 5/1988 | Mashima | .................... 250/548 |
| 4,795,244 A | * 1/1989 | Uehara et al. | ............. 356/401 |
| 4,958,920 A | * 9/1990 | Jorgens et al. | ............. 350/530 |
| 5,288,987 A | * 2/1994 | Vry et al. | ................. 250/201.3 |
| 5,796,517 A | 8/1998 | Sensui et al. | |
| 5,877,892 A | 3/1999 | Nakamura et al. | |
| 5,886,340 A | 3/1999 | Suzuki et al. | |
| 5,886,777 A | 3/1999 | Hirunuma | |
| 5,923,468 A | 7/1999 | Tsuda et al. | |
| 5,949,548 A | 9/1999 | Shirai | |
| 6,072,642 A | 6/2000 | Shirai | |
| 6,108,435 A | * 8/2000 | Mori et al. | ................. 382/106 |
| 6,144,021 A | 11/2000 | Suzuki | |
| 6,194,694 B1 | 2/2001 | Shirai | |
| 6,226,076 B1 | * 5/2001 | Yoshida | ..................... 356/5.06 |
| 6,324,024 B1 | * 11/2001 | Shirai et al. | ................. 359/884 |

OTHER PUBLICATIONS

Bass, M. et al. (1995). "Handbook of Optics: Fundamentals, Techniques, and Design, Second Edition, vol. 1," General Principles (pp. 1.69–1.70). New York: McGraw–Hill, Inc.*

* cited by examiner

Primary Examiner—Thomas H. Tarcza
Assistant Examiner—Brian K Andrea
(74) Attorney, Agent, or Firm—Greenblum & Bernstein, P.L.C.

(57) ABSTRACT

A surveying instrument having a sighting optical system and a phase-difference detection type focus detection device which detects a focus state of the sighting optical system from a correlation between a pair of images respectively formed by two light bundles which are respectively passed through two different pupil areas on an objective lens of the sighting optical system, the phase-difference detection type focus detection device includes a pair of line sensors, a condenser lens group for condensing the two light bundles which are respectively passed through the two different pupil areas, and a pair of separator lens groups for forming two images of the two light bundles which are passed through the condenser lens group on the pair of line sensors, respectively. The condenser lens group includes more than one sub lens group.

17 Claims, 5 Drawing Sheets

SURVEYING INSTRUMENT HAVING A SIGHTING TELESCOPE AND A PHASE-DIFFERENCE DETECTION TYPE FOCUS DETECTION DEVICE THEREFOR

BACKGROUND OF THE INVENTION

1. Field of the Invention

The present invention relates to a surveying instrument having a sighting telescope and a phase-difference detection type focus detection device for detecting a focus state of the sighting telescope.

2. Description of the Related Art

A conventional surveying instrument such as a total station has a function to measure the distance between two points and also horizontal and vertical angles. Such a surveying instrument is used in various locations, e.g., deep in the mountains, so that the surveying instrument is required to be small and easy to carry. The range of distance measurement of the surveying instrument generally ranges from approximately one meter to several kilometers. To make long-distance measurements possible, a sighting telescope of the surveying instrument is required to be a long-focus and high-resolution sighting telescope having a high magnification. Due to this reason, to make long-distance measurements possible without increasing the dimensions and the weight of the sighting telescope, a long focal length has to be achieved on a short-length sighting telescope. Furthermore, to miniaturize the sighting telescope, the effective aperture of the objective lens of the sighting telescope cannot be made large, which generally increases the f-number to therefore decrease the brightness of the image viewed through the sighting telescope.

In recent years a surveying instrument serving as a distance measuring device which does not require a corner cube reflector to be placed at a point of measurement has been developed. In the optical system of such a surveying instrument, since a measuring light is projected toward a target (sighting object) along the optical axis of the sighting telescope, a light transmitting mirror is disposed in the sighting telescope on the optical axis thereof. The light transmitting mirror is generally formed on the front surface of a transparent plane-parallel plate. A light receiving mirror is formed on the rear surface of the plane-parallel plate to receive the measuring light reflected by the target. Although it is preferable that the light receiving mirror be large to receive a sufficient amount of the measuring light, the optical path extending from the objective lens to the eyepiece of the sighting telescope is interrupted largely by the light receiving mirror if it is large.

Advancements have been made in the development of such a surveying instrument so that it incorporates an autofocus system for automatically focusing the sighting telescope on the target. A phase-difference detection type autofocus system is widely used in the autofocus therefor. In a phase-difference detection type autofocus system, an in-focus state is detected based on the correlation between two images formed by two light bundles which are respectively passed through two different pupil areas upon passing through different portions of an objective lens of the sighting telescope to bring the sighting telescope into focus in accordance with the detected in-focus state. More specifically, the phase-difference detection type autofocus system includes a condenser lens, a pair of separator lenses (a pair of image forming lenses) and a pair of line sensors. The pair of separator lenses are arranged apart from each other by the base length. The image of the target formed on a reference focal plane is separated into two images via the condenser lens and the pair of separator lenses to be respectively formed on the pair of line sensors. A focus state of the sighting telescope is detected based on the correlation between two images respectively formed on the pair of line sensors.

However, if a phase-difference detection type autofocus system is simply incorporated in a sighting telescope with a large f-number which includes a long-focus optical system accommodated in a short-length lens barrel, the following problems occur. Firstly, although an exit pupil is formed at a point which is extremely close to an in-focus point in a long-focus optical system whose mechanical length is short, the aforementioned two different pupil areas cannot be made large since the aforementioned light receiving mirror lies on the optical axis of the objective lens which has a relative large f-number. Furthermore, to miniaturize the surveying instrument, the focal length of each of the aforementioned pair of separator lenses should not be increased because the autofocus system is preferably small in order to miniaturize the surveying instrument. Moreover, since the size of each photoelectric converting element provided on each of the pair of line sensors is invariant, the power of the aforementioned condenser lens of the phase-difference detection type autofocus system has to be greatly increased to ensure that the two light bundles which are passed through the two different pupil areas of the objective lens of the sighting telescope are incident accurately on the effective areas of the pair of line sensors, respectively. However, if the power of the condenser lens is simply increased, aberration increases on each line sensor, and as a result, the performance of autofocus deteriorates. Furthermore, in the case of equipping each of various types of surveying instruments designed for different particular uses with a phase-difference detection type autofocus system, the autofocus system has to be specially designed for each surveying instrument to be suitable therefor so as to satisfy the above described several conditions. This generally requires a long period of time for development of the autofocus systems and a high cost of production.

SUMMARY OF THE INVENTION

The present invention has been devised in view of the problems noted above, and accordingly, an object of the present invention is to provide a surveying instrument having a sighting telescope and a phase-difference detection type focus detection device for detecting a focus state of the sighting telescope, wherein the two light bundles which are passed through the two different pupil areas on the objective lens of the sighting telescope are incident accurately on the effective areas of the pair of line sensors, respectively, without increasing aberration on each line sensor, and maintaining a low cost of production without any deterioration in the performance of the autofocus system.

To achieve the objects mentioned above, according to an aspect of the present invention, a surveying instrument is provided, having a sighting optical system and a phase-difference detection type focus detection device which detects a focus state of the sighting optical system from a correlation between a pair of images respectively formed by two light bundles which are respectively passed through two different pupil areas on an objective lens of the sighting optical system, the phase-difference detection type focus detection device including a pair of line sensors, a condenser lens group for condensing the two light bundles which are respectively passed through the two different pupil areas, and a pair of separator lens groups for forming two images of the two light bundles which are passed through the condenser lens group on the pair of line sensors, respectively. The condenser lens group includes more than one sub lens group.

In an embodiment, the phase-difference detection type focus detection device detects the focus state of the sighting optical system on a reference focal plane which is located at a position optically equivalent to a position of a focal plane of the objective lens; and at least one sub lens group of the condenser lens group is disposed on the objective lens side of the reference focal plane.

Preferably, another sub lens group, of the condenser lens group, is provided on the other side of the reference focal plane on which the pair of separator lens groups are disposed. The pair of separator lens groups and the pair of line sensors are provided as elements of a sensor unit which can be adopted for different types of surveying instruments equipped with an autofocus system, and wherein the specification of the at least one sub lens group of the condenser lens group, which is disposed on the side of the reference focal plane on which the objective lens is disposed, varies in accordance with a specification of a surveying instrument for which the sensor unit is adopted.

In an embodiment, the surveying instrument further includes a beam-splitting optical system positioned between the objective lens and an eyepiece of the sighting optical system; wherein the at least one sub lens group of the condenser lens group, which is disposed on the objective lens side of the reference focal plane, is formed on an exit surface of the beam splitting optical system.

In an embodiment, the surveying instrument further includes an optical distance meter which has a light-transmitting optical system for transmitting a measuring light via the objective lens, and a light-receiving optical system for receiving a portion of the measuring light which is reflected by a sighting object and passed through the objective lens.

Preferably, the light-transmitting optical system includes a reflection member provided on an optical axis of the objective lens behind the objective lens.

Preferably, elements of the optical distance meter are arranged in a direction defined along a line which extends across the diameter of the objective lens and intersects the optical axis of the objective lens, and each of the two different pupil areas is determined so as to have an elongated shape extending parallel to this direction.

In an embodiment, the surveying instrument further includes a pair of separator masks which are respectively positioned in the vicinity of the pair of separator lens groups between the pair of separator lens groups and the condenser lens group.

In an embodiment, the surveying instrument includes an erecting optical system. The beam-splitting optical system includes a beam splitting prism which is adhered to a reflection surface of the erecting optical system, a surface of the beam splitting prism which is adhered to the reflection surface being formed as a semitransparent surface which serves as a beam splitting surface. The at least one sub lens group of the condenser lens group, which is disposed on the objective lens side of the reference focal plane, is formed on an exit surface of the beam splitting prism.

In an embodiment, the reference focal plane is formed between the erecting optical system and another sub lens group, of the condenser lens group, which is provided on the other side of the reference focal plane on which the pair of separator lens groups are disposed; wherein the reference focal plane being formed at a position optically equivalent to a position at which a reticle of the sighting optical system is placed.

Preferably, the reflection member is made of a parallel-plate mirror having front and rear surfaces parallel to each other, the reflection member being inclined with respect to the optical axis.

According to another aspect of the present invention a surveying instrument is provided, having a sighting optical system and a phase-difference detection type focus detection device which detects a focus state of the sighting optical system from a correlation between a pair of images respectively formed by two light bundles which are respectively passed through two different pupil areas on an objective lens of the sighting optical system, the phase-difference detection type focus detection device including a pair of line sensors; a pair of separator lenses positioned in front of the pair of line sensors, respectively; a first sub lens group positioned in front of the pair of separator lenses; and a second sub lens group positioned in front of the first sub lens group. The phase-difference detection type focus detection device detects the focus state on a reference focal plane formed between the first sub lens group and the second sub lens group, the reference focal plane being located at a position optically equivalent to a position of a focal plane of the objective lens.

The present disclosure relates to subject matter contained in Japanese Patent Application No.2000-159764 (filed on May 30, 2000) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1:
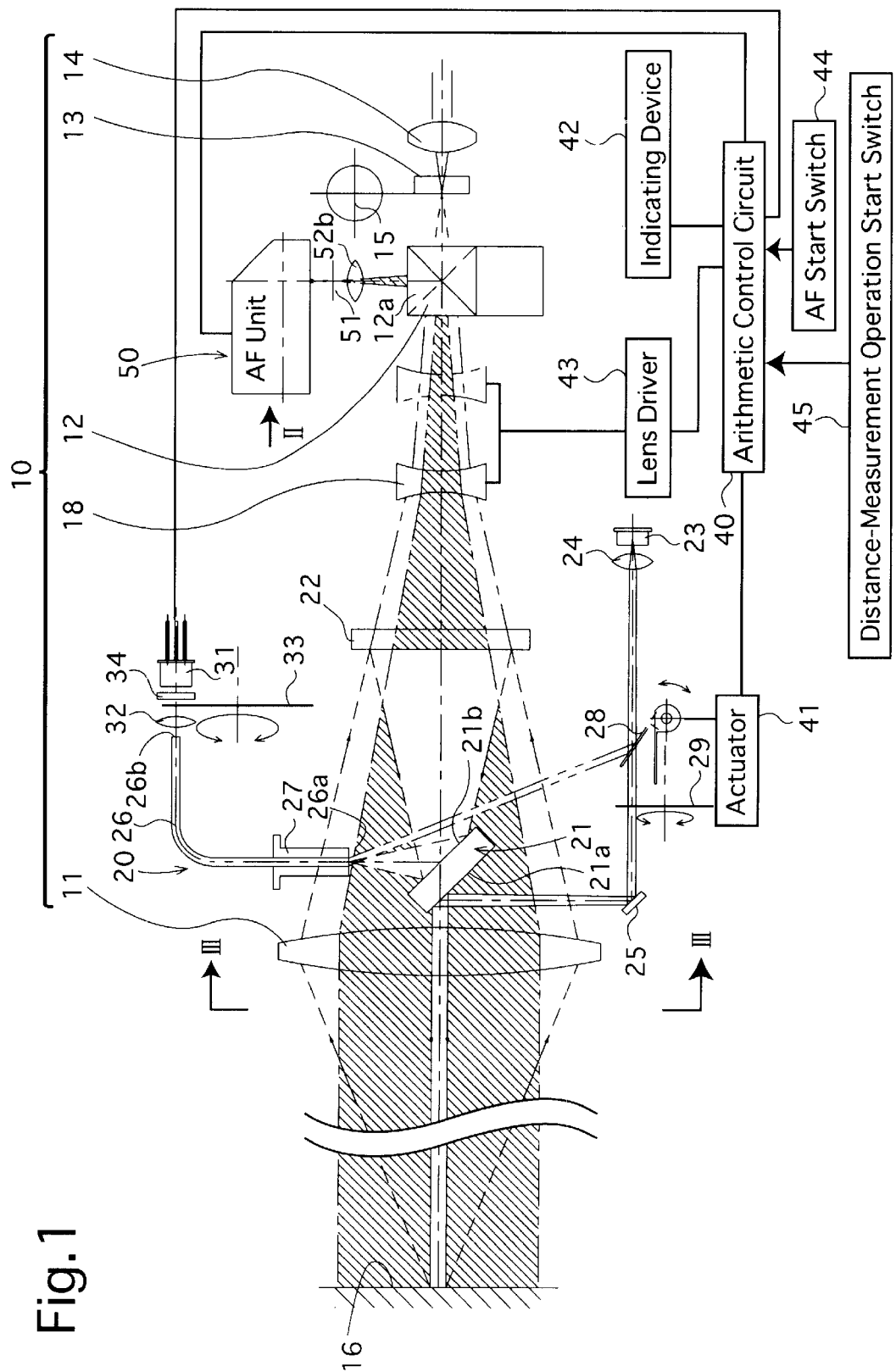
FIG. 1 is a schematic diagram of an embodiment of an electronic distance meter equipped with an autofocus system, according to the present invention.

FIGS. 1 through 5 show an embodiment of an electronic distance meter (EDM) equipped with an autofocus system, according to the present invention. The electronic distance meter is provided with a sighting telescope (sighting optical system) 10 and an optical distance meter 20. As shown in FIG. 1, the sighting telescope 10 is provided with an objective lens 11, a focusing lens (focus adjustment lens) 18, a Porro-prism erecting system (erecting optical system) 12, a focal-plane plate (reticle plate) 13, and an eyepiece lens 14, in that order from the object side (i.e., left to right as shown in FIG. 1). The focal-plane plate 13 is provided thereon with a reticle (cross hair) 15. The focusing lens 18 is guided in a direction of an optical axis of the sighting telescope 10. The image of a sighting object 16 that is formed through the objective lens 11 can be precisely focused on the front surface (the surface facing the objective lens 11) of the focal-plane plate 13 by adjusting the axial position of the focusing lens 18 in accordance with the distance of the sighting object 16 with respect to the sighting telescope 10. The user (surveyor) of the surveying instrument sights a magnified image of the sighting object 16, which is focused on the focal-plane plate 13, via the eyepiece 14.

The electronic distance meter is provided, behind the objective lens 11 of the sighting telescope 10, with a light transmitting/receiving mirror (reflection member) 21 and a wavelength selection mirror (wavelength selection filter) 22, which are arranged in that order from the object side. The light transmitting/receiving mirror 21 is made of a parallel-plate mirror having front and rear parallel surfaces positioned on the optical axis of the objective lens 11. The front surface of the parallel-plate mirror which faces the objective lens 11 is formed as a light transmitting mirror 21a, while the rear surface of the parallel-plate mirror which faces the wavelength selection mirror 22 is formed as a light receiving mirror 21b. The light receiving mirror 21b and the wavelength selection mirror 22 are fundamental optical elements of a light-receiving optical system of the optical distance meter 20.

The optical distance meter 20 is provided with a light-emitting element (laser diode) 23 which emits light (measuring light) having a specific wavelength. The measuring light emitted from the light-emitting element 23 is incident on the light transmitting mirror 21a via a collimating lens 24 and a fixed mirror 25. The measuring light, emitted from the light-emitting element 23 to be incident on the light transmitting mirror 21a, is reflected thereby to proceed toward the sighting object 16 along the optical axis of the objective lens 11. The collimating lens 24, the fixed mirror 25 and the light transmitting mirror 21a (light transmitting/receiving mirror 21) are fundamental optical elements of a light-transmitting optical system of the optical distance meter 20. The portion of the measuring light which is reflected by the sighting object 16, subsequently passed through the objective lens 11 which is not interrupted by the light transmitting/receiving mirror 21 is eventually reflected back to the light receiving mirror 21b by the wavelength selection mirror 22. Thereafter, the light receiving mirror 21b reflects the incident measuring light so as to make the measuring light enter at an incident end surface 26a of a light receiving optical fiber 26. A fiber holder 27 supports the incident end of the light receiving optical fiber 26 which has the incident end surface 26a. The fiber holder 27 is immovably supported together with the light transmitting/receiving mirror 21 by a fixing device (not shown) provided in a space behind the objective lens 11.

The electronic distance meter is provided between the light-emitting element 23 and the fixed mirror 25, on a distance-measuring optical path, with a switching mirror 28 and an ND filter 29. The light (measuring light) emitted by the light-emitting element 23 is incident on the fixed mirror 25 when the switching mirror 28 is retracted from the distance-measuring optical path between the collimating lens 24 and the fixed mirror 25, and the light (internal reference light) emitted by the light-emitting element 23 is reflected by the switching mirror 28 to be incident directly on the incident end surface 26a of the light receiving optical fiber 26 when the switching mirror 28 is positioned in the distance-measuring optical path between the collimating lens 24 and the fixed mirror 25. The ND filter 29 is used to adjust the amount of light of the measuring light incident on the sighting object 16.

The electronic distance meter is provided between an exit end surface 26b of the light receiving optical fiber 26 and a light-receiving element 31 with a condenser lens 32, an ND filter 33 and a band-pass filter 34, in that order from the exit end surface 26b to the light-receiving element 31. The light-receiving element 31 is connected to an arithmetic control circuit (controller) 40. The arithmetic control circuit 40 is connected to an actuator 41 which drives the switching mirror 28, and an indicating device (e.g., an LCD panel) 42 which indicates the calculated distance.

As is known in the art, the optical distance meter 20 establishes two different states: one state wherein the measuring light emitted by the light-emitting element 23 is supplied to the fixed mirror 25, and another state wherein the same light (internal reference light) is directly supplied to the incident end surface 26a of the light receiving optical fiber 26, which are determined in accordance with the switching state of the switching mirror 28 driven by the arithmetic control circuit 40 via the actuator 41. As described above, the measuring light supplied to the fixed mirror 25 is projected toward the sighting object 16 via the light-transmitting mirror 21a and the objective lens 11, and the measuring light reflected by the sighting object 16 is incident on the incident end surface 26a via the objective lens 11, the wavelength selection mirror 22, and the light receiving mirror 21b. Thereafter, both the measuring light reflected by the sighting object 16 to be eventually incident on the incident end surface 26a, and the internal reference light directly supplied to the incident end surface 26a via the switching mirror 28 are received by the light-receiving element 31. The arithmetic control circuit 40 detects the phase difference between the projecting light and the reflected light and the initial phase of the internal reference light, or the time difference between the projecting light and the reflected light, to calculate the distance from the electronic distance meter to the sighting object 16. The calculated distance is indicated by the indicating device 42. Such an operation of calculating the distance from the phase difference between the projecting light and the reflected light and from the initial phase of the internal reference light, or from the time difference between the projecting light and the reflected light is well known in the art.

Figure 2:
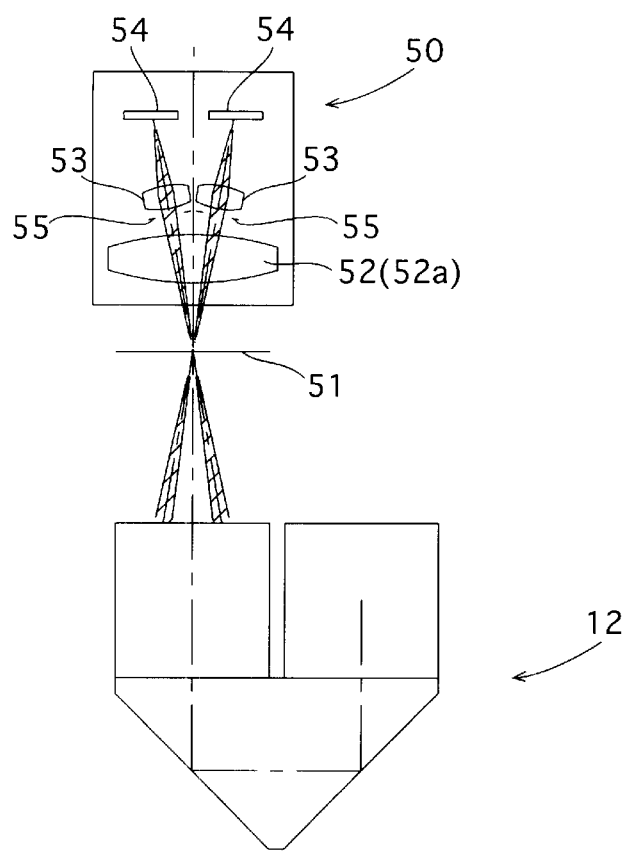
FIG. 2 is a conceptual diagram of a focus detecting device (phase-difference detection type focus detecting device) and a Porro-prism erecting system, as viewed in the direction of an arrow II shown in FIG. 1.

The Porro-prism erecting system 12 is of a type which employs three right angle prisms. A beam splitting prism (beam-splitting optical system) 12a is adhered to a fourth reflection surface of the Porro-prism erecting system 12. The surface of the beam splitting prism 12a which is adhered to the fourth reflection surface of the Porro-prism erecting system 12 is formed as a semitransparent surface (e.g., a half-silvered surface) which serves as a beam splitting surface. A phase-difference detection type AF sensor unit 50 is positioned on an optical path which extends from the beam splitting surface of the beam splitting prism 12a. The beam splitting surface splits the incident light bundle into two light bundles, so that one of the two light bundles proceeds toward the AF sensor unit 50 while the other light bundle proceeds toward the eyepiece 14. A reference focal plane 51 is provided between the Porro-prism erecting system 12 and the AF sensor unit 50 and is located at a position optically equivalent to the position at which the reticle 15 of the focal-plane plate 13 is placed. The AF sensor unit 50 detects the focus state (i.e., the amount of defocus and direction of focal shift) on the reference focal plane 51. FIG. 2 shows a conceptual diagram of the AF sensor unit 50 and the Porro-prism erecting system 12. A condenser lens group 52 consists of a first sub lens group 52a and a second sub lens group 52b (see FIG. 4). The two sub lens groups 52a and 52b are disposed on an optical path from the exit surface of the beam splitting prism 12a to a pair of separator lenses (i.e., a pair of separator lens groups) 53. As shown in FIG. 2, the AF sensor unit 50 includes the first sub lens group 52a, the pair of separator lenses 53, a pair of separator masks 55 located in the close vicinity of the pair of separator lenses 53, and a pair of line sensors (e.g., multi segment CCD sensors) 54 located behind the respective separator lenses 53. The second sub lens group 52b is positioned between the first sub lens group 52a and the exit surface of the beam splitting prism 12a. In FIG. 2, the second sub lens group 52b has been omitted for simplicity. The pair of separator lenses 53 are arranged apart from each other by the base length. The image of the sighting object 16 formed on the reference focal plane 51 is separated into two images via the condenser lens group 52 and the pair of separator lenses 53 to be respectively formed on the pair of line sensors 54. Each of the pair of line sensors 54 includes an array of photoelectric converting elements. Each photoelectric converting element converts the received light of an image into electric charges which are integrated (accumulated), and outputs as an integrated electric charge to the arithmetic control circuit 40 to constitute AF sensor data. The arithmetic control circuit 40 calculates an amount of defocus through a predetermined defocus operation in accordance with a pair of AF sensor data respectively input from the pair of line sensors 54. In an autofocus operation, the arithmetic control circuit 40 drives the focusing lens 18 to bring the sighting object into focus via a lens driver (see FIG. 1) 43 in accordance with the calculated amount of defocus. The defocus operation is well-known in the art. An AF start switch 44 and a distance-measurement operation start switch 45 are connected to the arithmetic control circuit 40.

The phase-difference detection AF sensor unit 50 detects an in-focus state from the pair of images respectively formed on the pair of line sensors 54 by two light bundles which are respectively passed through two different pupil areas 11A and 11B on the objective lens 11. The shape of each of the two pupil areas 11A and 11B are determined by the shape of the aperture formed on a corresponding one of a pair of separator masks 55 which are respectively positioned in the vicinity of the pair of separator lenses 53 between the condenser lens group 52 (first sub lens group 52a and second sub lens group 52b) and the pair of separator lenses 53. It should be noted that the hatched areas seen in FIGS. 2 and 3 conceptually indicate areas which correspond to the pupil areas determined by the apertures of the pair of separator masks 55.

Figure 3:
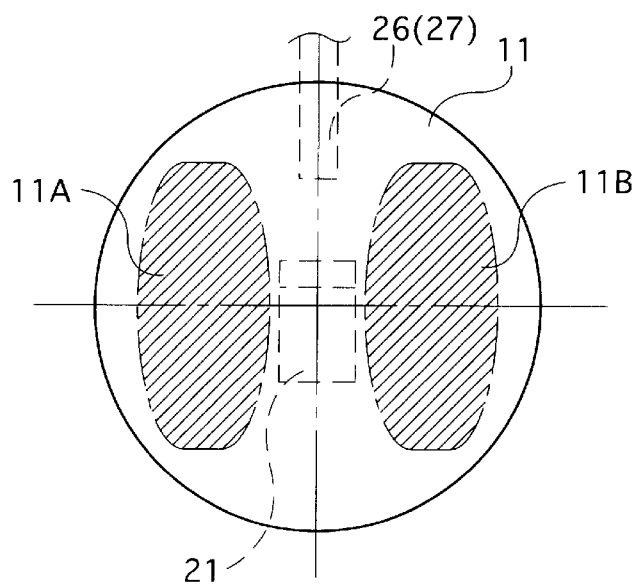
FIG. 3 is an explanatory view of an objective lens of a sighting telescope, as viewed in the direction of arrows III shown in FIG. 1, showing the positional relationship among two pupil areas defined on the objective lens, a light transmitting/receiving mirror, and a light receiving fiber.

FIG. 3 shows the positional relationship between the two pupil areas 11A and 11B and the positional relationship between the light transmitting/receiving mirror 21 and the light receiving optical fiber 26 (the fiber holder 27) of the optical distance meter 20. Although the positions, shapes and directions of the two pupil areas 11A and 11B are determined by the condenser lens group 52 (52a and 52b), the pair of separator lenses 53, the pair of separator masks 55, and the array of photoelectric converting elements of each line sensor 54 so as to satisfy the performance of autofocus, the positions of the two pupil areas 11A and 11B with respect to the center of the objective lens 11 can be determined relatively freely.

The present embodiment of the electronic distance meter having the above described structures is characterized by having the condenser lens group 52 which is constructed from the first sub lens group 52a and the second sub lens group 52b, wherein the first sub lens group 52a is disposed on the same side as where the pair of separator lenses 53 are disposed (the upper side as viewed in FIG. 4) with respect to the reference focal plane 51, and the second sub lens group 52b is disposed on the other side (the lower side as viewed in FIG. 4) of the reference focal plane 51 on the same side as where the objective lens 11 is disposed. Since the condenser lens group 52 is divided into first and second sub lens groups 52a and 52b, the power of the condenser lens group 52 is divided into two, so that aberrations of each of the two light bundles which are respectively passed through two pupil areas 11A and 11B can be reduced. At the same time, with the arrangement wherein the second sub lens group 52b is positioned on the objective lens 11 side (the lower side as viewed in FIG. 4) with respect to the reference focal plane 51, the two light bundles which are passed through the two pupil areas 11A and 11B are securely incident on the effective areas of the pair of line sensors 54, respectively, via the light-gathering function of the second sub lens group 52b. In the illustrated embodiment of the electronic distance meter, fundamental elements of the optical distance meter 20 such as the light transmitting/receiving mirror 21 and the light receiving optical fiber 26 (the fiber holder 27) are arranged in a diametrical direction of the objective lens 11 which intersects the optical axis of the objective lens 11, while each of the two pupil areas 11A and 11B is determined so as to have an elongated shape extending parallel to the diametrical direction. With this arrangement, the two light bundles which are passed through the two pupil areas 11A and 11B are securely incident on the effective areas of the pair of line sensors 54 without interfering with the fundamental elements of the optical distance meter 20.

Figure 4:
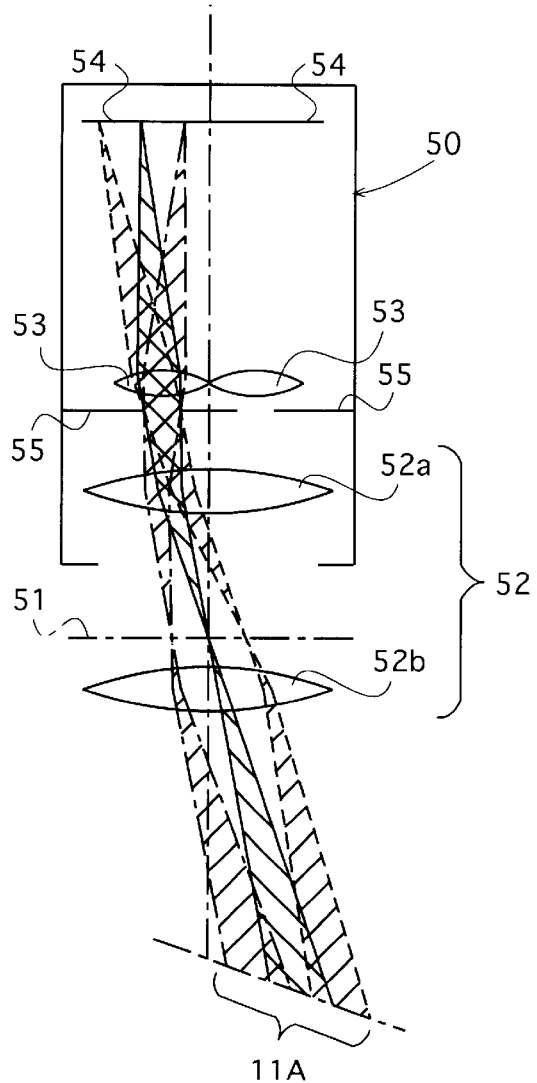
FIG. 4 is an explanatory view of a fundamental portion of an focus detecting device shown in FIG. 1, showing a state where one of the two light bundles which are respectively passed through the two pupil areas on the objective lens is incident on the corresponding line sensor via a condenser lens group consisting of two sub lens groups and the corresponding separator lens.
Figure 5:
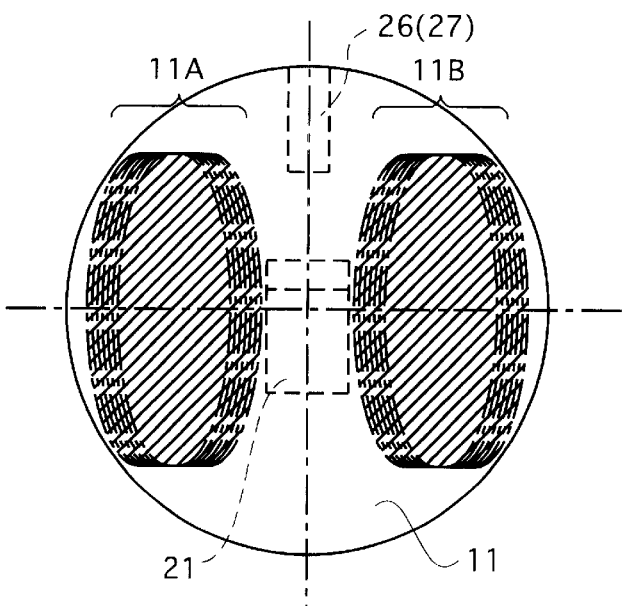
FIG. 5 is a view similar to that of FIG. 3 and shows the positional relationship among the two pupil areas on the objective lens, the light transmitting/receiving mirror, and the light receiving fiber, in the case where the focus detecting device shown in FIG. 1 is provided with a condenser lens group consisting of two sub lens groups as shown in FIG. 4.
Figure 7:
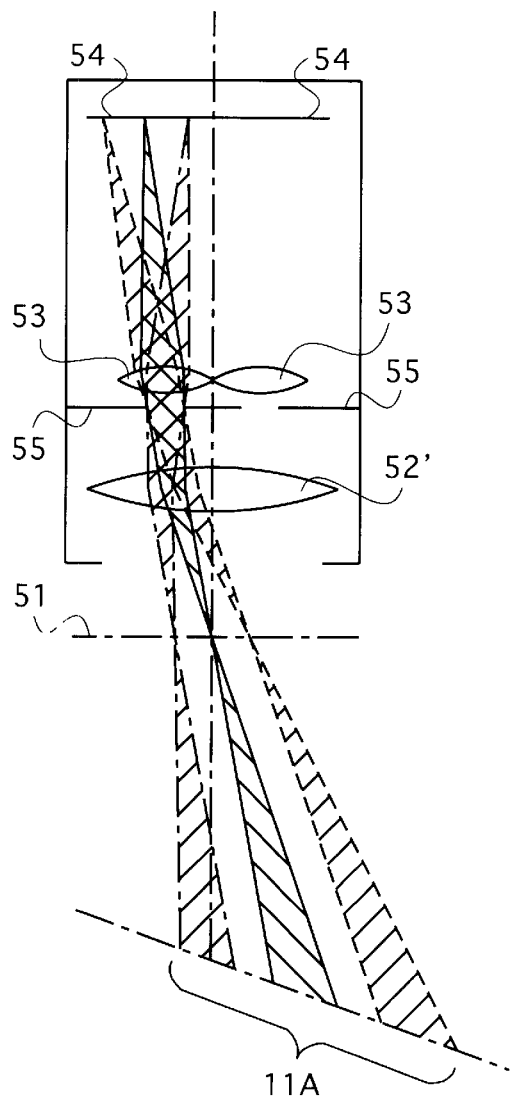
FIG. 7 is a view similar to that of FIG. 4 and illustrates a state where one of the two light bundles which are respectively passed through the two pupil areas on the objective lens is incident on the corresponding line sensor via a condenser lens group consisting of a single lens group.
Figure 8:
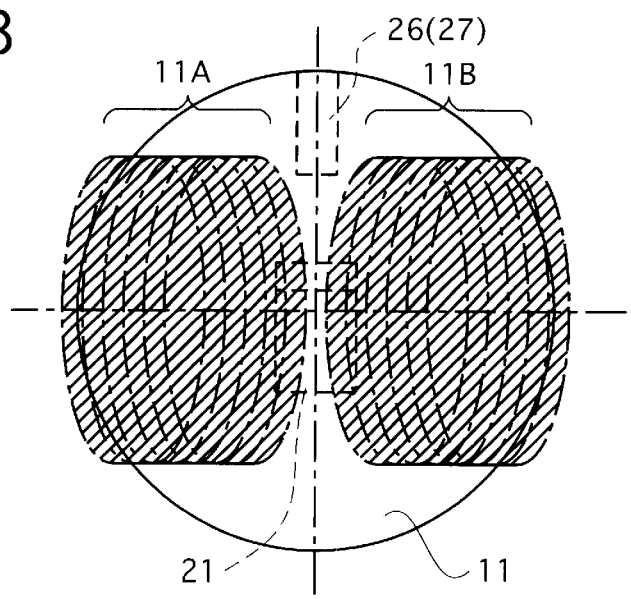
FIG. 8 is a view similar to that of FIG. 3 and shows the positional relationship among the two pupil areas defined on the objective lens, the light transmitting/receiving mirror, and the light receiving fiber, in the case where the AF sensor unit shown in FIG. 1 is provided with a condenser lens group consisting of a single lens group.

FIG. 4 shows a state where the light bundle (hatched area) which is passed through the corresponding pupil area 11A is incident on the corresponding line sensor 54 via the first and second sub lens groups 52a and 52b and the corresponding separator lens 53. As shown in FIG. 5, the light bundles which are respectively passed through the two pupil areas 11A and 11B on the objective lens 11 pass through optical paths which do not interfere with fundamental elements of the optical distance meter 20 such as the light transmitting/receiving mirror 21 and the light receiving optical fiber 26 (the fiber holder 27) via the light-gathering function of the second sub lens group 52b. As shown in FIGS. 7 and 8, if a condenser lens group 52' consisting of a single lens group having a small power is disposed as shown in FIG. 7, the light bundles which are respectively passed through the two pupil areas 11A and 11B on the objective lens 11 are obstructed by, e.g., the light transmitting/receiving mirror 21 and/or are incomplete due to partly transmitting outside the periphery of the objective lens 11. This reduces the amount of the measuring light incident on the pair of line sensors 54 and therefore deteriorates the performance of autofocus. Furthermore, if the power of the condenser lens group consisting of a single lens group is simply increased, aberration increases on each line sensor 54, and as a result, the performance of autofocus deteriorates. The electronic distance meter equipped with an autofocus system which has the above described structure performs a distance measuring operation in a manner such as described in the following description. In the first step, a surveyor (user) aims the sighting telescope 10 at the sighting object 16 so that the optical axis of the sighting telescope 10 is generally in line with the sighting object 16, while viewing the sighting object 16 through a collimator (not shown) which is attached to the sighting telescope 10. In the second step, the surveyor depresses the AF start switch 44 to perform the aforementioned autofocus operation to move the focusing lens 18 to an in-focus position (in-focus state) thereof relative to the sighting object 16. In the third step, in a state where the sighting telescope 10 is in focus relative to the sighting object 16, the surveyor adjusts the direction of the sighting telescope 10 so that the reticle (cross hair) 15 viewed through the eyepiece 14 is precisely centered on the sighting object 16 while looking into the eyepiece 14. In the fourth step, the surveyor depresses the distance-measurement operation start switch 45 to perform the aforementioned distance-calculating operation, wherein the calculated distance is indicated on the indicating device 42.

Figure 6:
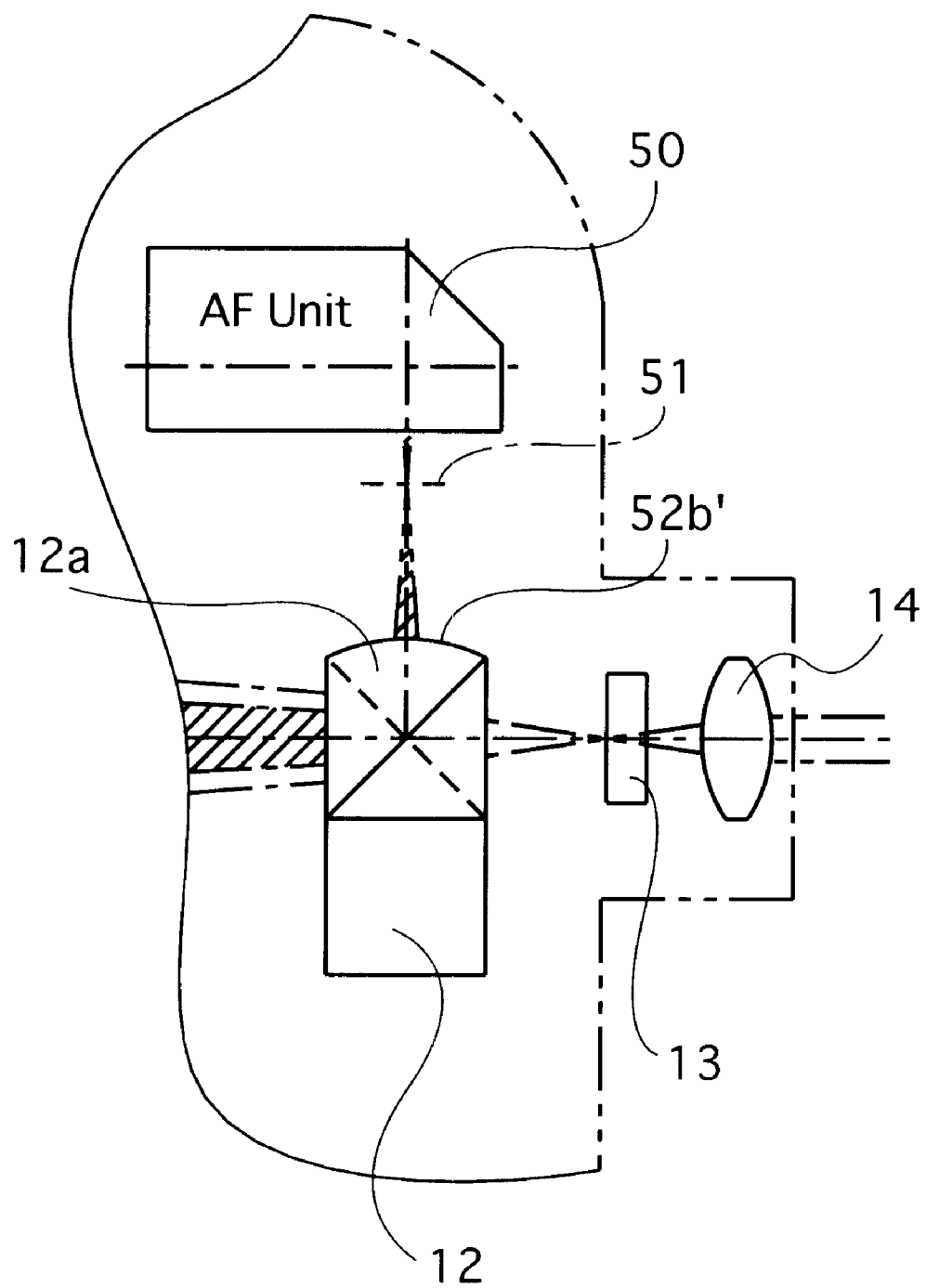
FIG. 6 is a side elevational view of a portion of the electronic distance meter shown in FIG. 1 in the case where one of the two sub lens groups of the AF sensor unit is formed integral with a beam splitting prism adhered to the Porro-prism erecting system.

In the above described embodiment of the electronic distance meter, the second sub lens group 52b, which is disposed on the objective lens 11 side of the reference focal plane 51, is composed of a single lens, however, the second sub lens group 52b can be formed as a condenser lens group 52b' which is formed on the exit surface of the beam splitting prism 12a as shown in FIG. 6.

In the above illustrated embodiment of the electronic distance meter, it can be clearly seen from FIGS. 1 and 4 that the first sub lens group 52a is provided inside the AF sensor unit 50 while the second sub lens group 52b is disposed outside the AF sensor unit 50. With this structure, if the AF sensor unit 50 including the first sub lens group 52a, the pair of separator lenses 53 and the pair of line sensors 54 is to be made as an AF sensor unit which can be adopted for different types of surveying instruments equipped with an autofocus system, the AF sensor unit 50 can be an optimum AF sensor unit for each of the different types of surveying instruments by selecting a most suitable second sub lens group 52b having an optimum power for the electronic distance meter of the surveying instrument in accordance with the specification thereof. Accordingly, the AF sensor unit 50 does not have to be designed specially for each surveying instrument equipped with an autofocus system. This greatly reduces the period of time required for the development of the autofocus systems, and reduces the cost of production therefor.

Furthermore, since the second sub lens group 52b is disposed on the objective lens 11 side of the reference focal plane 51, it is easy to match the AF sensor unit 50 with the sighting telescope 10.

In the above described embodiment of the electronic distance meter, although two sub lens groups 52a and 52b are disposed on the optical path from the exit surface of the beam splitting prism 12a to the pair of separator lenses 53, more than two sub lens groups can be disposed on the same optical path. In the case of three sub lens groups, only at least one of the three sub lens groups has to be disposed on the objective lens 11 side of the reference focal plane 51.

Although the Porro-prism erecting system 12 is used as an erecting optical system and also as a beam splitting optical system for splitting the incident light bundle into two light bundles so that one of the two light bundles proceeds toward the AF sensor unit 50 while the other light bundle proceeds toward the eyepiece 14, any other optical elements can be used instead of the Porro-prism erecting system 12.

As can be understood from the foregoing, according to the present invention, a surveying instrument having a sighting telescope and a phase-difference detection type focus detection device for detecting a focus state of the sighting telescope can be achieved, wherein the two light bundles which are passed through the two different pupil areas on the objective lens of the sighting telescope are accurately incident on the effective areas of the pair of line sensors, respectively, without increasing aberration on each line sensor, without increasing the cost of production, and without deteriorating the performance of the autofocus system.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A surveying instrument having a sighting optical system and a phase-difference detection type focus detection device which detects a focus state of said sighting optical system from a correlation between a pair of images respectively formed by two light bundles which are respectively passed through two different pupil areas on an objective lens of said sighting optical system, a beam splitting optical system defining an optical path of an automatic focusing unit, the optical path of the automatic focusing unit branching off from an optical path of the sighting optical system, said phase-difference detection type focus detection device comprising:

a pair of line sensors;

a condenser lens group that condenses said two light bundles which are respectively passed through said two different pupil areas;

a pair of separator lens groups that forms two images of said two light bundles which are passed through said condenser lens group on said pair of line sensors, respectively;

wherein said condenser lens group includes more than one sub lens group, wherein said phase-difference detection type focus detection device detects said focus state of said sighting optical system on a reference focal plane which is located at a position optically equivalent to a position of a focal plane of said objective lens, and wherein at least one sub lens group of said condenser lens group is disposed on the objective lens side of said reference focal plane, and at least another sub lens group of said condenser lens group is disposed on an opposite side of said reference focal plane from said objective lens.

2. The surveying instrument according to claim 1, wherein said pair of separator lens groups and said pair of line sensors are provided as elements of a sensor unit which can be adopted for different types of surveying instruments equipped with an auto focus system, and wherein the specification of said at least one sub lens group of said condenser lens group, which is disposed on the side of said reference focal plane on which said objective lens is disposed, varies in accordance with a specification of a surveying instrument for which said sensor unit is adopted.

3. The surveying instrument according to claim 1, said beam-splitting optical system positioned between said objective lens and an eyepiece of said sighting optical system;

wherein said at least one sub lens group of said condenser lens group, which is disposed on the objective lens side of said reference focal plane, is formed on an exit surface of said beam splitting optical system.

4. The surveying instrument according to claim 1, further comprising an optical distance meter which includes a light-transmitting optical system that transmits a measuring light via said objective lens, and a light-receiving optical system for receiving a portion of said measuring light which is reflected by a sighting object and passed through said objective lens.

5. The surveying instrument according to claim 4, wherein said light-transmitting optical system comprises a reflection member provided on an optical axis of said objective lens behind said objective lens.

6. The surveying instrument according to claim 4, wherein elements of said optical distance meter are arranged in a direction defined along a line which extends across the diameter of said objective lens and intersects the optical axis of said objective lens, and wherein each of said two different pupil areas is determined so as to have an elongated shape extending parallel to said direction.

7. The surveying instrument according to claim 4, further comprising a pair of separator masks which are respectively positioned in the vicinity of said pair of separator lens groups between said pair of separator lens groups and said condenser lens group.

8. The surveying instrument according to claim 3, further comprising an erecting optical system;

wherein said beam-splitting optical system comprises a beam splitting prism which is adhered to a reflection surface of said erecting optical system, a surface of said beam splitting prism which is adhered to said reflection surface being formed as a semitransparent surface which serves as a beam splitting surface; and wherein said at least one sub lens group of said condenser lens group, which is disposed on the objective lens side of said reference focal plane, is formed on an exit surface of said beam splitting prism.

9. The surveying instrument according to claim 8, wherein said reference focal plane is formed between said erecting optical system and another sub lens group, of said condenser lens group, which is provided on the other side of said reference focal plane on which said pair of separator lens groups are disposed; and wherein said reference focal plane is formed at a position optically equivalent to a position at which a reticle of said sighting optical system is placed.

10. The surveying instrument according to claim 5, wherein said reflection member is made of a parallel-plate mirror having front and rear surfaces parallel to each other, said reflection member being inclined with respect to said optical axis.

11. A surveying instrument having a sighting optical system and a phase-difference detection type focus detection device which detects a focus state of said sighting optical system from a correlation between a pair of images respectively formed by two light bundles which are respectively passed through two different pupil areas on an objective lens of said sighting optical system, a beam splitting optical system defining an optical path of an automatic focusing unit, the optical path of the automatic focusing unit branching off from an optical path of the sighting optical system, said phase-difference detection type focus detection device comprising:

a pair of line sensors;

a pair of separator lenses positioned in front of said pair of line sensors, respectively;

a first sub lens group positioned in front of said pair of separator lenses; and a second sub lens group positioned in front of said first sub lens group;

wherein said phase-difference detection type focus detection device detects said focus state on a reference focal plane formed between said first sub lens group and said second sub lens group, said reference focal plane being located at a position optically equivalent to a position of a focal plane of said objective lens, and wherein said second sub lens group is disposed on the objective lens side of said reference focal plane, and said first sub lens group is disposed on an opposite side of said reference focal plane from said objective lens.

12. A surveying instrument having a sighting optical system and a phase difference detection type focus detection device which detects a focus state of the sighting optical system based upon a correlation between a pair of images respectively formed by two light bundles which are respectively passed through two different pupil areas on an objective lens of the sighting optical system, the sighting optical system including a focus adjustment lens, said phase difference detection type focus detection device comprising:

a pair of line sensors;

a condenser lens group that condenses said two light bundles which are respectively passed through said two different pupil areas, said condenser lens group comprising more than one sub lens group and being distinct from the focus adjustment lens; and a pair of separator lens groups for forming two images of said two light bundles which are passed through said condenser lens group on said pair of line sensors, respectively;

wherein said phase-difference detection type focus detection device detects said focus state of said sighting optical system on a reference focal plane which is located at a position optically equivalent to a position of a focal plane of said objective lens, and wherein at least one sub lens group of said condenser lens group is disposed on the objective lens side of said reference focal plane, and at least another sub lens group of said condenser lens group is disposed on an opposite side of said reference focal plane from said objective lens.

13. The surveying instrument according to claim 11, the objective lens of the sighting optical system and the focus adjustment lens defining a first optical axis, said more than one sub lens group of said condenser lens group defining a second optical axis extending transverse to said first optical axis.

14. The surveying instrument according to claim 1, each sub lens group of said condenser lens group being positioned behind the splitting surface of said beam splitting optical system.

15. The surveying instrument according to claim 11, each sub lens group of said condenser lens group being positioned behind the splitting surface of said beam splitting optical system.

16. The surveying instrument according to claim 1, further comprising a focusing lens movable in association with an output of said focus detection device.

17. The surveying instrument according to claim 11, further comprising a focusing lens movable in association with an output of said focus detection device.

* * * * *